S. D. BALES.
ANIMAL TRAP.
APPLICATION FILED FEB. 17, 1919.
1,312,943.
Patented Aug. 12, 1919.
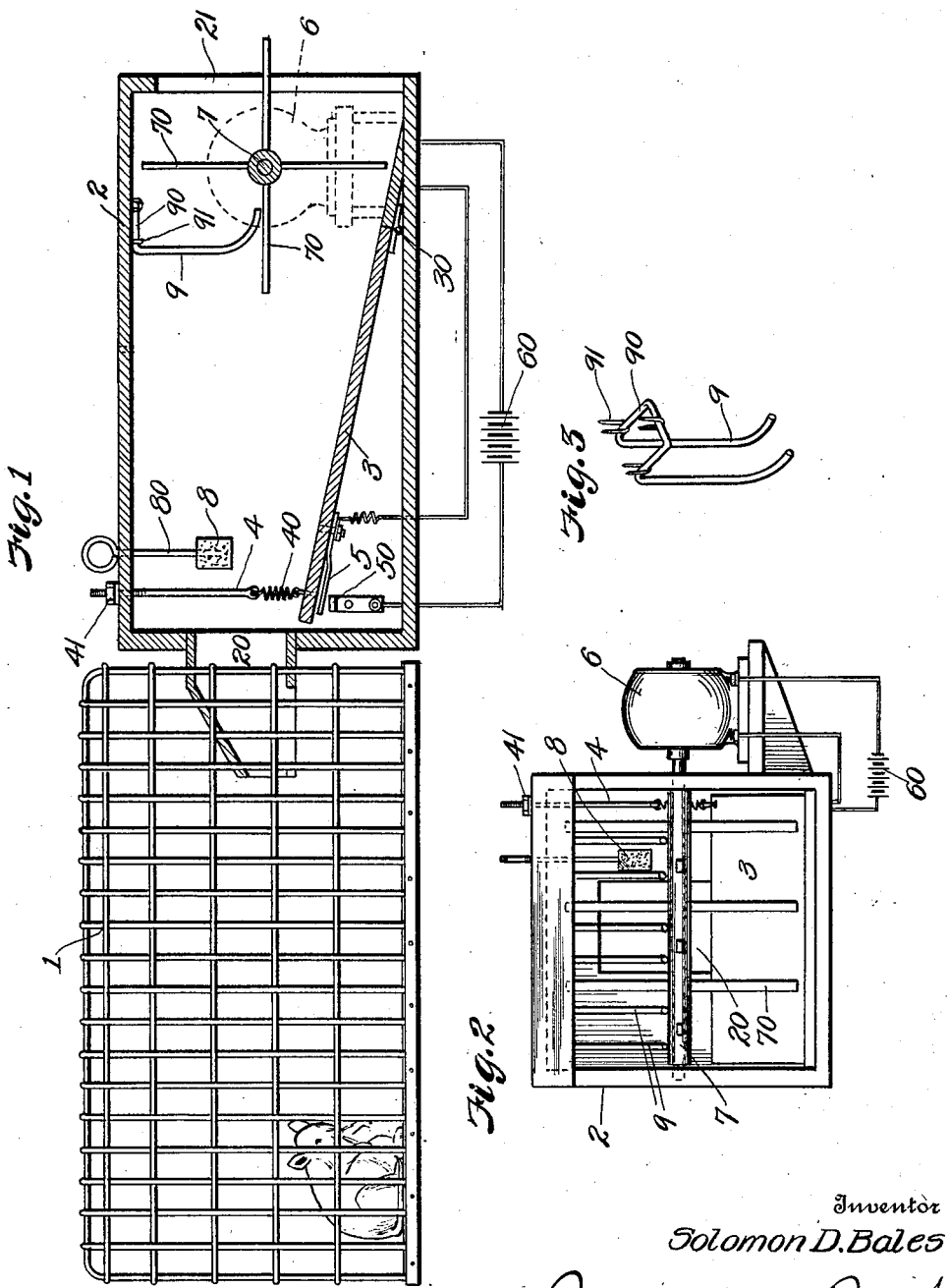
Inventor
Solomon D. Bales
By Reynolds & Cook
Attorneys

UNITED STATES PATENT OFFICE.

SOLOMON D. BALES, OF SEATTLE, WASHINGTON.

ANIMAL-TRAP.

1,312,943.                     Specification of Letters Patent.        Patented Aug. 12, 1919.

Application filed February 17, 1919. Serial No. 277,539.

*To all whom it may concern:*

Be it known that I, SOLOMON D. BALES, a citizen of the United States, and resident of the city of Seattle, county of King, and State of Washington, have invented certain new and useful Improvements in Animal-Traps, of which the following is a specification.

My invention relates to animal traps, and consists of a trap having two principal parts: first, a chamber in which the animal is enticed and in which the operating mechanisms of the trap are placed, and second, a cage or confining chamber into which the rat is discharged from the receiving chamber.

The object of my invention is to provide a trap for animals of such character that the trap will be automatically reset or left in condition for catching another animal, as soon as one has been secured. The general object of my invention is to improve on the character of traps, so as to make them more efficient and also make them capable of securing and caring for considerable numbers of animals.

The features of my invention, which I believe to be novel, will be first described and then particularly defined by the claims.

In the accompanying drawings, I have shown my invention embodied in the form of construction which I most prefer to use.

Figure 1 is a side elevation of the complete trap, the receiving chamber being shown in section.

Fig. 2 is an end view showing the open end of the receiving chamber, and Fig. 3, in perspective, shows one pair of guard fingers which are placed inside the receiving opening.

The cage 1, in which the rats or other animals are held, may be of any suitable and desired construction and size. The purpose of this is simply to provide a place for holding the animals after they have been caught. This is provided at one end with an opening, which is placed to register with the opening through which the animal is discharged from the receiving chamber. This opening is shown at 20.

The receiving chamber 2 is in the general form of a box, open at one end. This opening should be relatively large, that is, of sufficient size to furnish ample room for the entrance of the animal which it is intended to catch. Inside the receiving chamber is a hinged floor section consisting of the board 3, this being hinged at 30 and having its opposite or swinging end yieldingly supported, so that it will be depressed by a slight weight, as of an animal thereon.

The means shown herein for supporting this swinging end of the floor section, consists of a rod 4 and a spring 40. The rod 4 is employed merely as a convenient means for supporting the spring and for adjusting the same, so as to get the desired degree of sensitiveness of action of the device. This rod 4 is shown as being threaded and extending through the upper wall of the receiving chamber 2, where it is provided with a nut 41. By adjusting the position of this nut on the rod 4, the position, which would be occupied by the swinging end of the floor section 3, is varied.

Secured to the swinging end of the floor section 3, herein shown as at the bottom side thereof, is an electrical contact member 5. A complemental contact member 50 is placed beneath the board 3 and in position to be engaged by the bar 5, when this end of the floor section is depressed. By careful adjustment of the supporting means, consisting of the spring 40, the floor section may be so supported, that it need move but a very short distance to make contact with the other member 50 and thus to close an electric circuit.

A shaft 7 is mounted to extend across the receiving chamber adjacent to the opening 21, through which the animal comes. This shaft is provided with a series of arms 70, of which adjacent arms occupy different angular positions, as herein illustrated. The adjacent or successive arms are separated 90° from each other. The spacing of these arms is such that a double space leaves ample room for the passage of the animal which it is desired to catch, while a single spacing, that is the distance between two successive or adjacent arms, is insufficient for the passage of the animal.

Means are provided for rotating this shaft. The most obvious means and that herein illustrated, consists in securing to this shaft an electric motor 6. This motor will be connected with some source of power, the same in the drawings being indicated by the conventional representation of a battery at 60. The wires which supply current to the motor may be connected with any source of supply of electricity, as for instance a lighting or power circuit, or with any convenient kind of a battery.

A suitable bait, as 8, is supported by a rod 80, located near the inner end of the receiving chamber, that is near the end which is farthest removed from the opening 21. An animal reaching this device, when it is in its normal condition, finds the shaft 7 not rotating. At this time there is ample room for him to pass between the arms 70 and enter the receiving chamber. As he passes up the swinging floor member 3, he finally reaches a point where his weight causes depression of the floor member 3 to produce contact between the two terminals 5 and 50. This closes the feed circuit of the motor and it commences to revolve.

The direction of rotation is such that the lower halves of the arms are moving inward with reference to the receiving chamber. The mere rotation of these arms would ordinarily be sufficient to frighten the animal and cause him to go in the opposite direction, and as the only place in this direction is through the opening 20, he will pass into the holding cage, or chamber 1, where he will remain until removed by hand. If desired, some form of trap door may be used in connection with this discharge opening.

In case the animal should attempt to go out through the opening 21, through which he entered the receiving chamber, the receiving arm 70 will strike him and throw him violently back into the chamber. This is due to the fact that the rapid rotation of the arms practically reduces the available opening to the space existing between adjacent arms, instead of double this space, as it is when the shaft is not rotating. The final result will be his passage into the cage 1.

In case an animal should return to the receiving chamber from the cage 1, the first thing to occur would be the closing of the motor circuit, whereupon the motor would start up and the animal would have no opportunity to escape through the receiving opening 21.

To prevent the probability of the animal leaping to the upper side of the shaft 7 and being carried out by the revolving arms, I have shown guard fingers 9, as secured to the roof of this chamber and projecting downward in positions which alternate with the positions occupied by the arms 70. These would prevent the animal going out through the upper part of the revolving devices.

As shown in Fig. 3, these guard arms are made of wire bent into such shape that two arms are formed from the same piece of wire. This forms a flat U-shape portion 90, having a base which may be conveniently secured to the roof of the chamber by means of three small staples 91.

This trap may be made of sizes to adapt it to the catching of animals of all sizes. It automatically comes to set position and thus needs no special setting. It may continue its action until the holding cage is full, if not sooner emptied.

What I claim as my invention is:

1. In an animal trap, a chamber having a free entrance, a shaft extending across said entrance, a plurality of rows of arms secured to said shaft and adapted to reach substantially across said entrance, said arms being separated in each row to permit free passage of the animals, and opposite the spaces between the arms of adjacent rows, and means controlled by the animal after passing said arms whereby said shaft is caused to rotate.

2. In an animal trap, a box having a relatively large entrance opening, a weight controlled floor member, a shaft extending across said opening, an electric motor for turning said shaft, a plurality of rows of arms carried by said shaft, said arms of each row alternating in position lengthwise of the shaft with those of the adjacent rows, and being separated in each row sufficient to permit free passage of animals between them, an electric switch controlled by said weight controlled floor member and controlling the operation of said motor.

3. In an animal trap, in combination, a receiving chamber having an entrance opening and a discharge opening, a holding chamber communicating with said discharge opening, a shaft extending across said receiving opening and carrying a plurality of rows of arms, and means for producing a persistent rotation of said shaft set in action by the animal after entering the receiving chamber and ceasing when he enters the holding chamber.

4. In an animal trap, in combination, a receiving chamber having an open end, a shaft extending centrally across said opening and having a plurality of rows of arms extending therefrom and adapted to extend substantially across said opening, said arms of one row being opposite to the spaces between the arms of adjacent rows, and spaced apart in each row, distances permitting free passage of animals between them, a hinged floor section, a yielding support for said hinged floor section, a motor connected with and adapted to turn said shaft, and a switch controlling the current to said motor and closed by the depression of said hinged floor section.

5. In an animal trap, in combination, a case having a relatively large entrance, a shaft extending across this entrance, a plurality of rows of spokes extending from said shaft, the spokes of successive rows alternating in position in the direction of the length of the shaft the spokes in each row being spaced apart a distance to permit free passage of the animal between them, fixed fingers extending between the paths of revolution of said spokes, and means set in motion by the animal to cause rotation of said shaft.

Signed at Seattle, Washington, this 10th day of February, 1919.

SOLOMON D. BALES.

Copies of this patent may be obtained for five cents each, by addressing the "Commissioner of Patents, Washington, D. C."